(12) United States Patent
Frazier et al.

(10) Patent No.: US 10,162,660 B2
(45) Date of Patent: Dec. 25, 2018

(54) APPLICATION-LEVEL PROCESSOR PARAMETER MANAGEMENT

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 14/958,151

(22) Filed: Dec. 3, 2015

(65) Prior Publication Data

US 2017/0161089 A1    Jun. 8, 2017

(51) Int. Cl.
  *G06F 9/455*  (2018.01)
  *G06F 9/445*  (2018.01)

(52) U.S. Cl.
  CPC .......... *G06F 9/45558* (2013.01); *G06F 9/445* (2013.01)

(58) Field of Classification Search
  CPC combination set(s) only.
  See application file for complete search history.

(56) References Cited

U.S. PATENT DOCUMENTS

| | | | |
|---|---|---|---|
| 7,127,548 B2 * | 10/2006 | Bennett | G06F 9/45533 711/6 |
| 7,607,042 B2 * | 10/2009 | Ferren | G06F 11/0721 712/228 |
| 7,725,895 B2 * | 5/2010 | Galal | G06F 9/45533 718/1 |
| 8,627,315 B2 * | 1/2014 | Li | G06F 9/45533 709/224 |
| 8,756,582 B2 | 6/2014 | Serrano | |
| 2002/0147759 A1 * | 10/2002 | Ranganathan | G06F 9/50 718/104 |

(Continued)

OTHER PUBLICATIONS

Giles R. Frazier, et al.,"Application-Level Initiation of Processor Parameter Adjustment", U.S. Appl. No. 14/958,148, filed Dec. 3, 2015.

(Continued)

*Primary Examiner* — Wissam Rashid
*Assistant Examiner* — Michael W Ayers
(74) *Attorney, Agent, or Firm* — Cantor Colburn LLP; Steven Chiu (57) ABSTRACT

Embodiments relate to application-level processor parameter management. An aspect includes granting, by a hypervisor of a computer system, access to an operating parameter of a processor of the computer system to an application that is running on the computer system. Another aspect includes, based on the granting of access to the operating parameter, receiving, by an optimization function in the computer system from the application, a request to adjust the operating parameter. Another aspect includes determining an adjusted value for the operating parameter during execution of the application. Another aspect includes setting the operating parameter to the adjusted value in a parameter register of the processor. Another aspect includes executing the application according to the parameter register by the processor.

14 Claims, 5 Drawing Sheets

(56) References Cited

U.S. PATENT DOCUMENTS

| | | | | |
|---|---|---|---|---|
| 2002/0194463 | A1* | 12/2002 | Henry | G06F 9/30149 |
| | | | | 712/239 |
| 2006/0095691 | A1* | 5/2006 | Bell, Jr. | G06F 9/30043 |
| | | | | 711/154 |
| 2010/0186010 | A1* | 7/2010 | Chalemin | G06F 9/5077 |
| | | | | 718/1 |
| 2011/0173433 | A1* | 7/2011 | Ford | G06F 9/3844 |
| | | | | 713/100 |
| 2012/0303932 | A1 | 11/2012 | Farabet et al. | |
| 2013/0036296 | A1* | 2/2013 | Hickey | G06F 9/30014 |
| | | | | 712/222 |
| 2013/0073833 | A1* | 3/2013 | Konigsburg | G06F 9/3838 |
| | | | | 712/205 |
| 2013/0179663 | A1* | 7/2013 | Heisch | G06F 9/3802 |
| | | | | 712/207 |
| 2013/0227529 | A1 | 8/2013 | Li et al. | |
| 2014/0047341 | A1* | 2/2014 | Breternitz | G06F 9/505 |
| | | | | 715/735 |
| 2015/0082285 | A1 | 3/2015 | Li et al. | |
| 2016/0077571 | A1* | 3/2016 | Sagar | G06F 1/3206 |
| | | | | 713/340 |
| 2016/0306644 | A1* | 10/2016 | Kelly | G06F 9/45558 |

OTHER PUBLICATIONS

Giles R. Frazier, et al.,"Performance Optimization Engine for Processor Parameter Adjustment", U.S. Appl. No. 14/958,153, filed Dec. 3, 2015.

IBM, et al,; "Programming Language Independent Interface for Reusable Programmed Components"; ip.com; IP.com 000115966; p. 1-3; Mar. 30, 2005.

IBM, et al.; "Run-Time Engine Architecture for Reusable Programmed Components"; ip.com; IP.com No. 000116250; p. 1-3; Mar. 30, 2005.

IBM; "Event-Based Branch Facility [Category Server]"; PowerISA Version 2.047B; Book II, Chapter 7; p. 817-820; Apr. 9, 2015.

IBM; "Performance Monitor Facility"; PowerISA Version 2.047B; Book III, Chapter 9; p. 983-1002; Apr. 9, 2015.

Jonathan D. Bradbury, et al.; "Fingerprint-Based Processor Parameter Management"; U.S. Appl. No. 14/958,142, filed Dec. 3, 2015.

List of IBM Patents or Patent Applications Treated as Related— Date Filed: Mar. 3, 2016; 1 page.

* cited by examiner

APPLICATION-LEVEL PROCESSOR PARAMETER MANAGEMENT

BACKGROUND

The present invention relates generally to computer processors, and more specifically, to application-level processor parameter management.

One of the functions of a managed run-time environment is processor performance optimization. Optimization typically involves compiling code so as to provide optimal processor performance for the current workload and hardware. Such code optimization may significantly improve processor performance during execution of the code. Processor performance may be further increased by adjustment of the hardware configuration and/or operating parameters of a processor to fit a specific workload. However, a hypervisor or operating system (OS), which may have access to the operating parameters of the processor, may have no knowledge of the actual current runtime environment workload.

SUMMARY

Embodiments include a method, system, and computer program product for application-level processor parameter management. An aspect includes granting, by a hypervisor of a computer system, access to an operating parameter of a processor of the computer system to an application that is running on the computer system. Another aspect includes, based on the granting of access to the operating parameter, receiving, by an optimization function in the computer system from the application, a request to adjust the operating parameter. Another aspect includes determining an adjusted value for the operating parameter during execution of the application. Another aspect includes setting the operating parameter to the adjusted value in a parameter register of the processor. Another aspect includes executing the application according to the parameter register by the processor.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of application-level processor parameter management are provided, with exemplary embodiments being discussed below in detail. Less-privileged software, such as an application or compiler, running on a computer system may be granted access via the hypervisor or OS to adjust various processor parameters to fit the current task. By performing such task-specific adjustments, processor performance may be improved. Optimized values for the processor parameters that are being adjusted are determined in the background while the requesting application is being executed.

Processor parameters may be stored in one or more registers in the processor. In some embodiments, such a register may be referred to as a workload optimization register (WOR). The WOR is written into by the hypervisor to set processor parameters. In some embodiments, additional registers holding values for additional control parameters may also be included in the processor. Processor parameters that may be stored in a WOR include, but are not limited to, the branch history algorithm, branch history depth, the cache data prefetch depth, whether to enable store-hit-load prevention, whether to route all fixed-point operations to the fixed point unit (FXU), whether to route all loads to the load unit (not the load store unit), the instruction prefetch depth, and the store gather window. Less privileged, or user-space software, such as an application, may issue a request for control over the WOR to the hypervisor. The hypervisor may grant control of the WOR to the requesting application if, for example, the application is trusted, and if the parameter adjustment will not affect other threads in the processor. Once control is granted, the application may adjust one or more of the processor parameters to fit the application's workload.

The application may call an optimization function to adjust the processor parameters. The call to the optimization function may include an identifier, or index, corresponding to the calling application, or, in some embodiments, to a location in the application from which the call is made. A table may be maintained that associates indexes with respective WOR values. If a call to the optimization function for which no index is listed in the table is issued, a WOR value is determined for the current workload while the current workload is executing and stored in the table with an assigned index. The WOR value may be determined in any appropriate manner in various embodiments. In some embodiments, the call to the optimization function may specify the one or more parameters (e.g., P1, P2, P3, etc.) to be adjusted; in such embodiments, only the parameters in the WOR that are specified in the call to the optimization function are adjusted. For example, a call to the optimization function may be limited to only branch prediction related parameters, or prefetch related parameters. An example of a call to the optimization function may take the form of: OPTIMIZE (P1, P2, . . . , Pn; index). In some embodiments, a call to the optimization function that does not specify any parameters may adjust all the parameters that are in the WOR. In further embodiments, the call to the optimization function may further include a target performance. Issuing of the call to the optimization function may be triggered by initiation of a new task in the processor in some embodiments. The adjustment of the parameters may be performed in the background during the execution of the task for which the parameters are being adjusted.

The determination of parameter values to match the current task may be performed using a performance monitoring unit (PMU), which operates in the background while the task executes to determine optimal parameter values. The PMU may be implemented in hardware or software in various embodiments. The PMU may issue event based branch (EBB) interrupts to calling application that return performance data that was determined by the PMU, and calling application may then set the WOR based on the data provided by the PMU. For example, if data prefetch depth is the parameter to be optimized, a counter in the PMU may be used to count load instructions and another counter to count load cache hits. For example, when one of the counters reaches a predetermined value, the PMU causes an EBB to the application. The application EBB handler then reads the counters, calculates the data cache hit rate (i.e. the percentage of load instructions that were able to access their data from the cache), and adjusts the prefetch depth based the measured rate. For example, if the measured data cache hit rate was below a desired level, the application EBB handler may increase the data prefetch depth; if the measured data cache hit rate was more than that required to attain an acceptable level of performance, then the application EBB handler may decrease the data cache prefetch depth in order to conserve resources. Other embodiments may include a PMU that calculates the data cache hit rate prior to causing the EBB to the application, thereby eliminating the need for the application EBB handler to calculate it from the counter values. The EBB handler then returns control to the application and, in some embodiments also provides an index corresponding to the optimized data prefetch depth to the calling application.

In some embodiments, if the index received with the call to the optimization function is equal to a default value such as zero, the calling application is requesting that a new optimal WOR value, for all parameters that are stored in the WOR, be determined as the application executes. In further embodiments, a call to the optimization function may specify that, for example, only a single type of parameters, such as branch prediction related parameters or prefetch related parameters, in the WOR be adjusted. For example, the optimization function may begin the WOR adjustment process by setting the branch-related WOR parameters to an initial value, setting up the PMU to monitor performance as execution of the calling application proceeds, and returning to the calling application. As EBBs, which may correspond to performance measurement periods, are issued by the PMU, the optimization function handles them as needed. After the performance data has been gathered for a first branch history depth value, the optimization function iterates through all other possible branch history depths to find the optimal depth corresponding to the current branch prediction algorithm. The optimization function may then move on to a next branch prediction algorithm, and repeat the measurement process by iterating through all possible branch history depths to determine the optimal branch history depth for the optimal branch prediction algorithm. Whenever a performance level is measured by the PMU that exceeds all previously-measured performance values for other values of the parameters, the parameters associated with the measured performance level are stored. When the highest performance level is determined, the associated parameters are stored in the WOR and in the index table associated with an index. In further embodiments, a target performance may be provided to the optimization function, and the parameters may be determined that meet the target performance. In some embodiments, if the index received with the call to the optimization function is equal to a predetermined value, the calling application is requesting that the WOR contents be set back to their default values and any ongoing parameter optimization be terminated. The application might request a reset of the WOR to the default value after completing a first task and beginning to perform a subsequent task in some embodiments.

When the determination of new WOR parameter(s) has been completed, the optimization function may issue a lightweight interrupt (such as event-based branch (EBB)) that informs the calling application that the optimization is complete, and provide the calling application with a new index that is now associated with the new WOR value in the table. The runtime environment may use the provided index value in future optimization requests. The index may be transferred by the EBB in any appropriate manner. For example, in some embodiments, the index may be provided to the calling application in a preconfigured memory location. In other embodiments, the index may be provided via an EBB status register.

Figure 1:
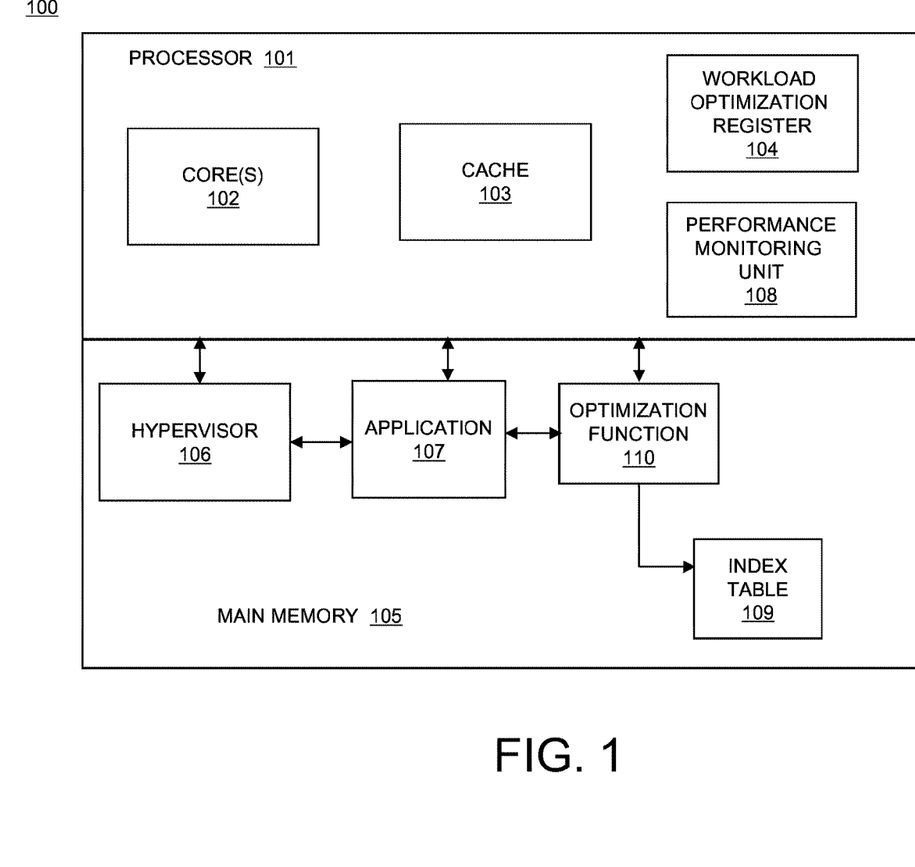
FIG. 1 depicts a system for application-level processor parameter management in accordance with an embodiment.

FIG. 1 illustrates an embodiment of a computer system 100 for application-level processor parameter management. Computer system 100 includes a processor 101 in communication with a main memory 105. The processor 101 includes one or more cores 102 that execute instructions using cache memory 103. Processor 101 further includes a WOR 104, which holds various parameters that dictate the functioning of the processor 101. Parameters that are stored in WOR 104 may include any of, but are not limited to, the branch history algorithm, branch history depth, the cache data prefetch depth, whether to enable store-hit-load prevention, whether to rout all fixed-point operations to the fixed point unit (FXU), whether to rout all loads to the load unit (not the load store unit), the instruction prefetch depth, and the store gather window. Computer programs, such as hypervisor 106 and application 107, are stored in main memory 105 and executed by the processor 101. Any appropriate number of applications may be executed by a computer system such as computer system 100. An application such as application 107 may issue a call to optimization function 110 to update the parameters in WOR 104. In various embodiments, optimization function 110 may be an application library routine or a part of the application itself. The optimization function 110 uses the PMU 108 and index table 109 to update the WOR 104, as discussed below with respect to FIG. 2. Index table 109 stores indexes and previously determined associated WOR values for reuse. The optimization function 110 uses PMU 108 to determine new parameters that match a current workload based on a received request to update processor parameters that does not include an index that is listed in the index table 109. PMU 108 may be implemented in hardware or software in various embodiments.

Figure 2:
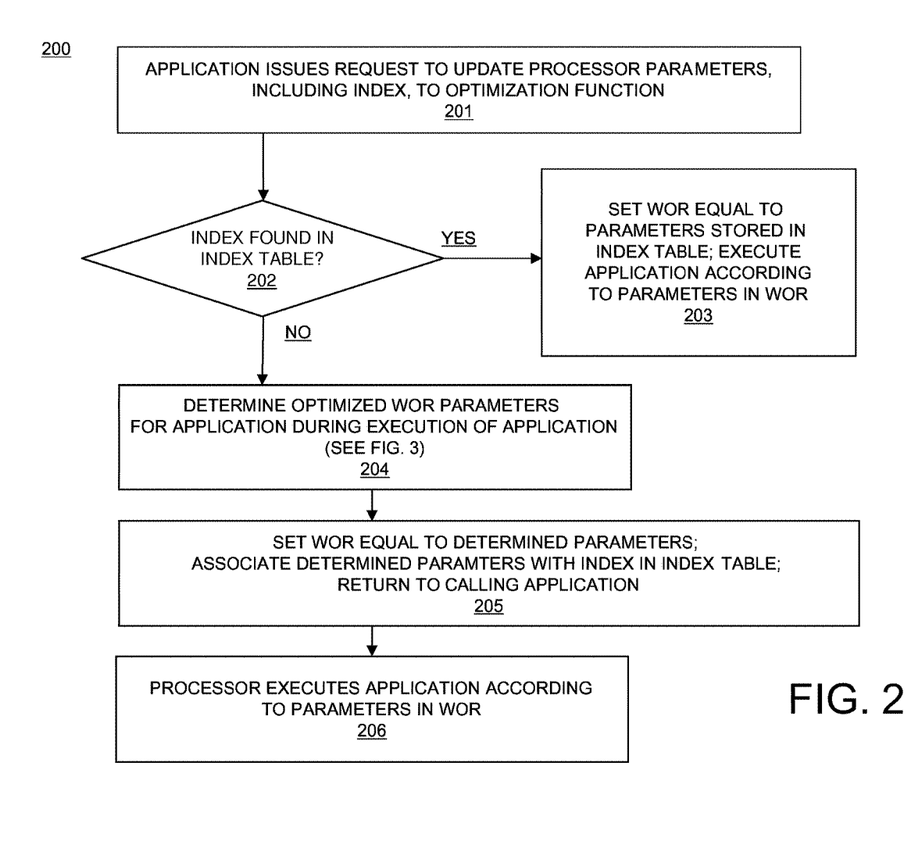
FIG. 2 depicts a process flow for application-level processor parameter management in accordance with an embodiment.

FIG. 2 illustrates an embodiment of a method 200 for application-level processor parameter management. FIG. 2 may be implemented in computer system 100 of FIG. 1. In block 201, an application, such as application 107, issues request to update processor parameters in the WOR 104, which may be, in some embodiments, OPTIMIZE (index), to optimize function 110 in the computer system 100. The request to update processor parameters may further specify, in some embodiments, a subset of the processor parameters in the WOR 104 to be adjusted (e.g., OPTIMIZE(index, $P_1, \ldots, P_N$)). The sending of the request to update the processor parameters may be triggered by starting of a new workload by the application 107, starting processing of new data by the application 107, starting of a loop in the application 107, or for any other appropriate reason in various embodiments. Next in block 202, the optimization function 110 determines whether the index that was included in the request to update processor parameters is in the index table 109. If the index that was received in the request to update processor parameters is listed in the index table 109, flow proceeds to block 203, in which the WOR 104 is set equal to the WOR value that is associated with the index in the index table 109, and the processor 101 executes the calling application according to the parameters in the WOR 104.

If it is determined in block 202 that the index that was included in the request to update processor parameters is not in the index table 109, flow proceeds to block 204 from block 202. In block 204, adjusted, or optimized, parameter values are determined while the calling application 107 executes. In some embodiments, all of the parameters stored in the WOR 104 may be optimized in block 204. In other embodiments, only a subset of the parameters that were specified by the request to update processor parameters is optimized in block 204. Block 204 may be implemented by the optimization function 110 using PMU 108, and is discussed in further detail with respect to FIGS. 3 and 4. Then, in block 205, the parameters that were determined in block 204 are written into the WOR 104, and execution returns to the application 107. The parameters that were determined in block 204 are also stored in the index table 109 with an associated index. The associated index may be different from the index that was received with the request in block 201, in which case, the associated index is also returned to the calling application 107 for future use. The associated index may be returned to the application 107 via an EBB or a status register in various embodiments. Lastly, in block 206, the processor 101 executes the application 107 according to the parameters in the WOR 104.

Figure 3:
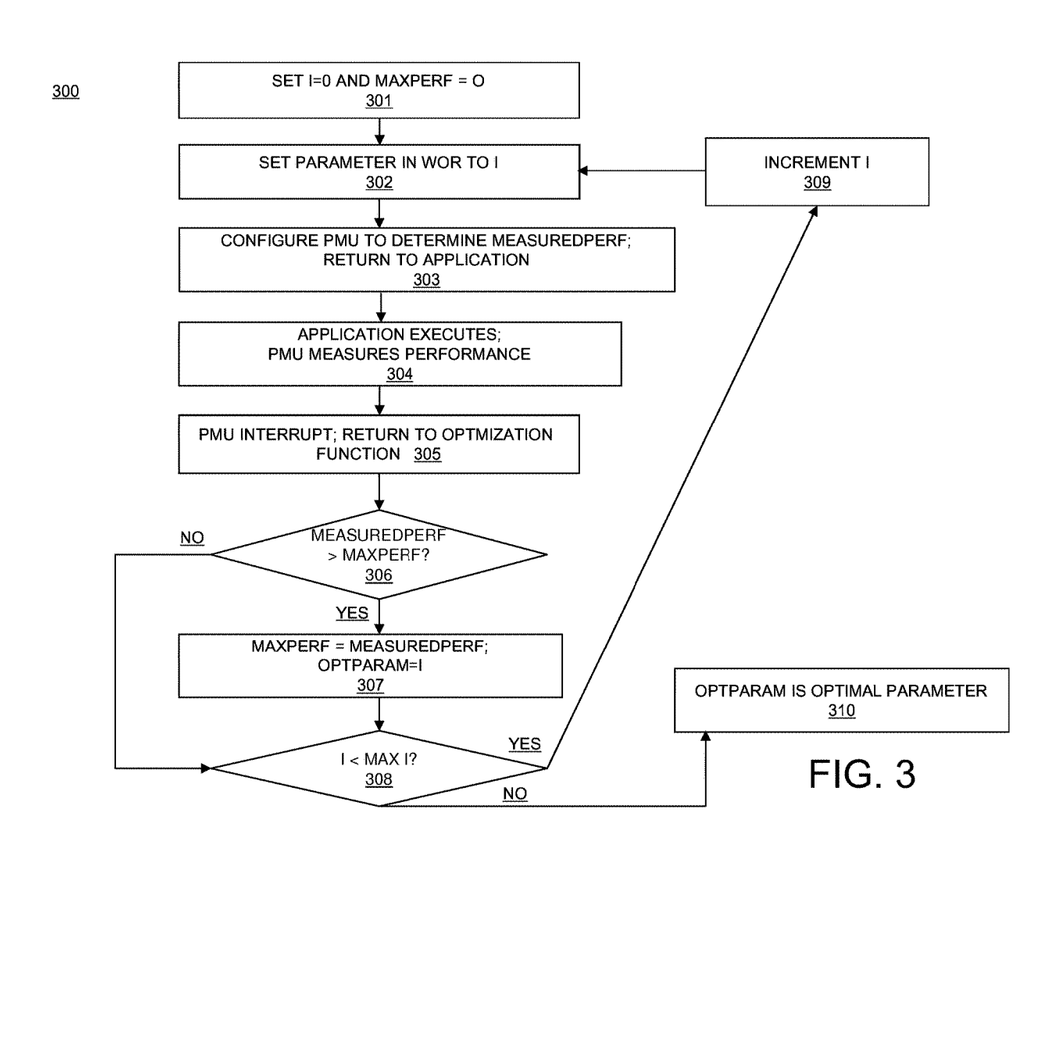
FIG. 3 depicts a process flow for new parameter determination in accordance with an embodiment.

FIG. 3 illustrates an embodiment of a method 300 for adjusted parameter determination. Method 300 is implemented in computer system 100 of FIG. 1, and may be performed in embodiments of block 204 of FIG. 2. Method 300 illustrates determination of a single parameter; however, in various embodiments of parameter adjustment, multiple parameters may be adjusted simultaneously by iterating through all combinations of values for all of the parameters that are being adjusted. First, in block 301, in optimization function 110, a variable I is set equal to zero, and a variable MAXPERF (i.e., maximum performance) is set equal to zero. Then, in block 302, the parameter that is being adjusted is set equal to I in the WOR 104 by optimization function 110. In block 303, the optimization function 110 configures the PMU 108 to measure the performance of the processor 101. The optimization function 110 may configure the PMU 108 to measure performance in any appropriate manner and for any appropriate amount of time. The optimization function 110 then returns execution to the application 107 that issued the HCALL or OPTIMIZE request. Then, in block 304, the processor 101 executes the application 107 using the current value of I in the WOR 104, and the PMU measures the current performance of the processor 101 while the application 107 is executed. The PMU 108 measures the performance according to the configuration by the optimization function 110 that was performed in block 303, for example, for a specified amount of time. Then, in block 305, when the PMU completes the performance measurement (i.e. determines the value of MEASUREDPERF), an interrupt is issued to transfer control back the optimization function 110. In block 306, the optimization function 110 determines whether the measured performance is greater than MAXPERF. If it is determined in block 306 that the measured performance is greater than MAXPERF, flow proceeds from block 306 to block 307. In block 307, MAXPERF is set equal to the measured performance, and a variable OPTPARAM is set equal to I. Flow then proceeds from block 307 to block 308.

If it is determined in block 306 that the measured performance is not greater than MAXPERF, flow proceeds from block 306 directly to block 308. In block 308, it is determined whether I is less than the maximum possible value (i.e., $I_{MAX}$) of the parameter that is being optimized. If it is determined in block 308 that I is less than $I_{MAX}$, flow proceeds from block 308 to block 309, in which I is incremented. Blocks 302, 303, 304, 305, 306 optionally 307, and 308, are repeated until it is determined in block 308 that I is not less than $I_{MAX}$, at which point flow proceeds from block 308 to block 310, and the value OPTPARAM is determined to be the optimal parameter.

In some embodiments, if other parameters are also to be optimized, then method 300 may be repeated, as necessary, for all parameters in the WOR 104 that are being optimized so as to obtain optimal performance for processor 101. Any optimization procedure may be used during the optimization process, including optimizing parameters one at a time in any appropriate order, measuring performance of all combinations of parameters to determine the optimal combination, repeating the optimization of some parameters after others have been changed, or employing algorithms such as machine learning algorithms to determine the optimal parameter set.

Figure 4:
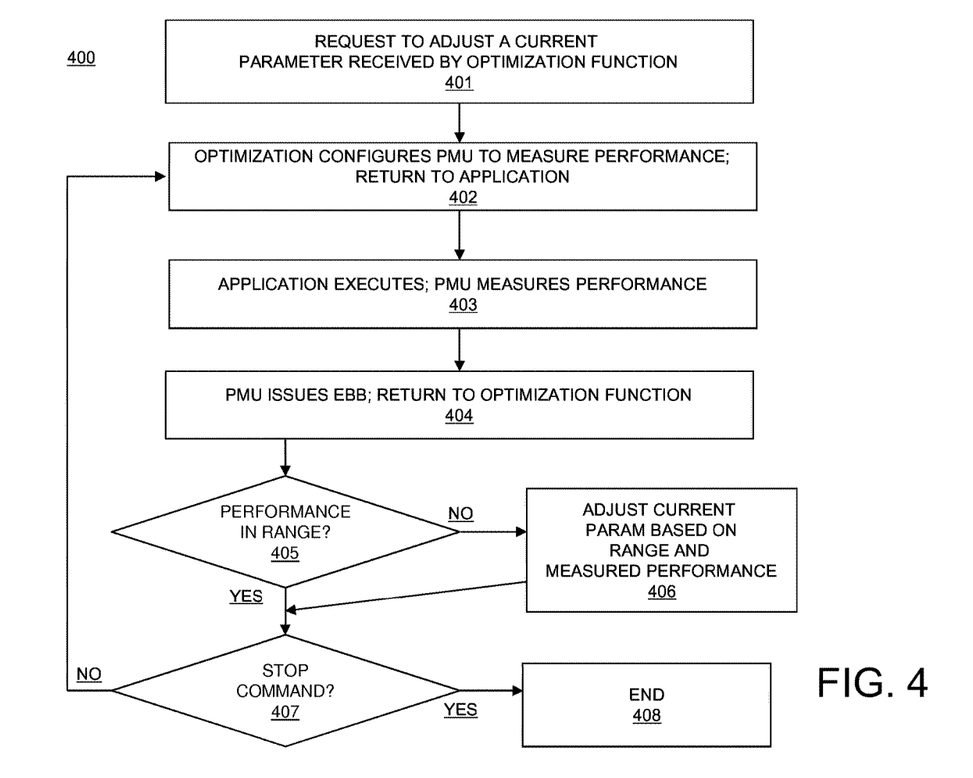
FIG. 4 depicts another process flow for new parameter determination in accordance with an embodiment.

FIG. 4 illustrates another embodiment of a method 500 for adjusted parameter determination. Method 400 is implemented in computer system 100 of FIG. 1, and may be performed in embodiments of block 204 of FIG. 2. Method 400 illustrates determination of a single parameter; however, in various embodiments of parameter adjustment, multiple parameters may be adjusted simultaneously by iterating through all combinations of values for all of the parameters that are being adjusted. The embodiment of method 400 continuously monitors processor performance, and makes adjustments to parameters in the WOR 104 whenever the processor performance is determined to be outside a desired range. For example, in an embodiment, an application 107 may issue a request such as measure (data_prefetch_hit_rate, branch_direction_hit_rate) to the optimization function 110 so as to continuously monitor the data prefetch hit rate and modify prefetch-related parameters when the data prefetch hit rate is outside a desired range, and also continuously monitor the branch prediction hit rate, and modify branch prediction related parameters when the branch prediction hit rate is outside of a desired range. In further embodiments, performance monitor counters may be initiated for data prefetch hits, total loads, branch direction hits, and total branches. These counters accumulate until a command to stop the counters and compute the measured values based on the counter values is received from application 107, for example: end_measure (measured_data_prefetch_hit_rate, measured_branch_direction_hit_rate). If either measurement is out of the expected range, then either the prefetch depth and/or branch algorithm are adjusted as needed.

First, in block 401, the application 107 issues a request to adjust a current parameter to the optimization Function 110. The request includes a specification of the particular current parameter and a target performance range (e.g., OPTIMIZE (PARAM, TARGET_PERF_RANGE)). Next, in block 402, the optimization function 110 configures the PMU 108 to measure the performance of the processor 101. The optimization function 110 may configure the PMU 108 to measure performance in any appropriate manner and for any appropriate amount of time. The optimization function 110 then returns execution to the application 107 that issued the request. In block 403, the application 107 executes, and the PMU 108 measures the performance of the processor 101 according to the configuration of block 402. Then, in block 404, the PMU 108 completes the measurement (based on, for example, expiration of a counter) and an EBB occurs that transfers control back to the optimization function 110. In block 405, the optimization function 110 determines whether the measured performance is within the target performance range. If it is determined in block 405 that the measured performance is within the target performance range, flow proceeds to block 407. If it is determined in block 405 that the measured performance is not within the target performance range, flow proceeds to block 406, and the current parameter is adjusted in the WOR 104 based on the target performance range and the measured performance. The current parameter may be adjusted up or down by any appropriate amount in block 406. Then, flow proceeds from block 406 to block 407.

In block 407, it is determined whether a command to stop the performance monitoring and parameter adjustment has been received by the optimization function 110 from the application 107. If it is determined in block 407 that the stop command has not been received, flow returns from block 407 to block 402. Blocks 402, 403, 404, 405, and, based on the determination of block 405, block 406, are then repeated until it is determined in block 407 that the stop command has been received. The repetition of blocks 402-406 ensures that the performance stays within the desired range. When it is determined in block 407 that the stop command has been received, flow proceeds from block 407 to block 408, and method 400 ends.

Figure 5:
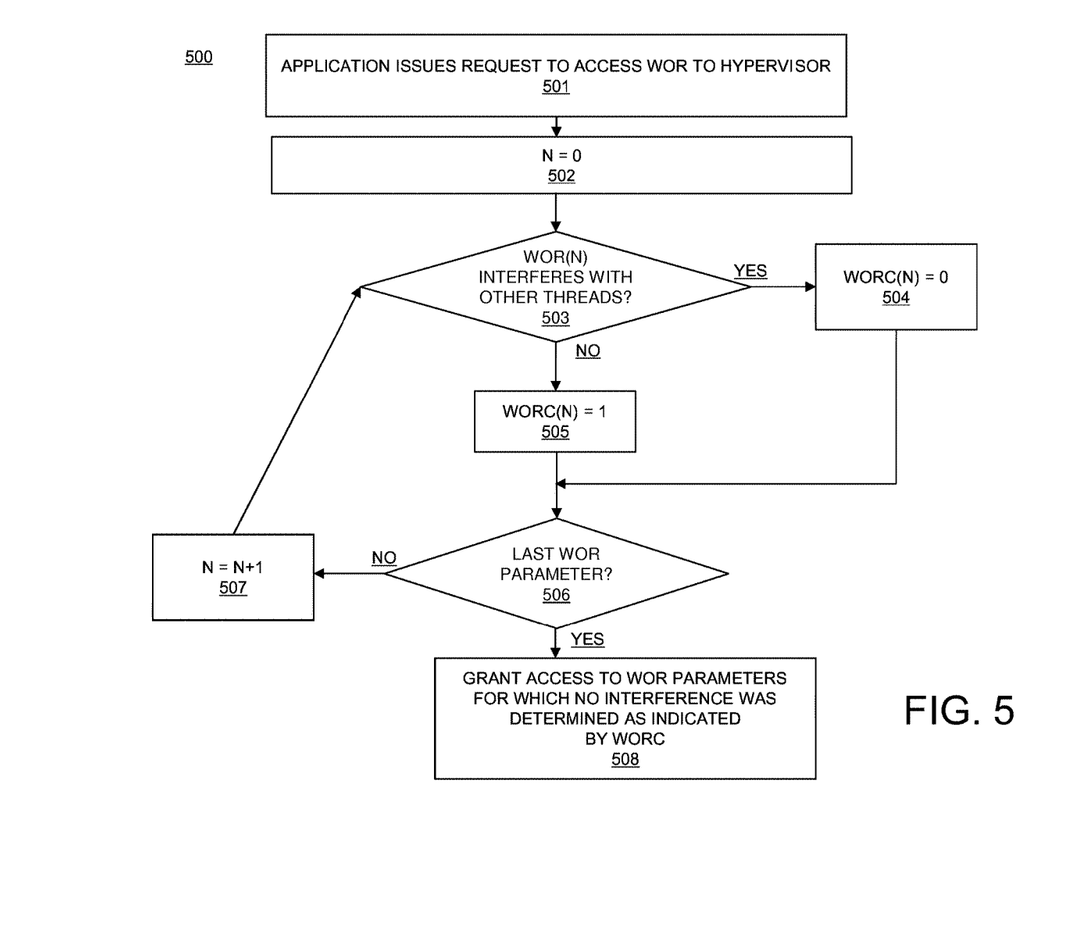
FIG. 5 depicts a process flow for granting an application access to a workload optimization register (WOR) in accordance with an embodiment.

In some embodiments, before the application 107 issues the request to the optimization function 110 to adjust the parameters in the WOR 104, as described by method 200, the application 107 issues a request to the hypervisor 106 for access to the WOR 104. The hypervisor 106 may grant the application 107 access to the WOR 104 based on the application 107 being a trusted application in some embodiments, and may also determine whether adjusting the parameters in the WOR 104 by the application 107 will interfere with any other applications that are currently executing on the processor 101. The hypervisor 106 may grant the application 107 access to only a subset of the WOR parameters in some embodiments. An embodiment of a method 500 for granting an application access to the WOR 104. First, in block 501, the application 107, which may be one of a plurality of applications executing on the computer system 100, issues a request to the hypervisor 106 for access to the WOR 104. Then, in block 502, a variable N is set equal to zero. In block 503, it is determined whether adjustment of WOR(N) (i.e., parameter N in the WOR) by application 107 will interfere with other threads in the processor 101. If it is determined in block 503 that adjustment of WOR(N) will interfere with other threads in the processor 101, flow proceeds from block 503 to block 504, in which an element N in an array WORC (i.e., WORC(N)) is set equal to zero to indicate determination of interference. Flow then proceeds to block 506. If it is determined in block 503 that adjustment of WOR(N) will not interfere with other threads in the processor 101, flow proceeds from block 503 to block 505, in which WORC(N) is set equal to 1 to indicate determination of no interference. Flow then proceeds to block 506, in which it is determined whether N is the last WOR parameter. If it is determined in block 506 that N is not the last WOR parameter, flow proceeds from block 506 to block 507, in which N is incremented, and then back to block 503. Blocks 503, 504 or 505, 506, and 507 are repeated for each parameter in the WOR 104, such that WORC holds a zero or 1 value for each of the parameters in the WOR 104. When it is determined in block 506 that WORC has been set for the last WOR parameter, flow proceeds to block 508, in which the hypervisor grants the application 107 access to the WOR parameters for which no interference is determined, e.g., the WOR parameters having a value of 1 in WORC. Only those parameters to which the application 107 is granted access may be adjusted by the application 107 using the optimize function 110.

Technical effects and benefits include improved performance in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for application-level processor parameter management in a computer system comprising a hypervisor, a processor, one or more applications executing in the computer system, a workload optimization register (WOR) that stores one or more operating parameter values of the processor, and an optimization function that executes on the computer system that is separate from the hypervisor, the method comprising:

granting, by the hypervisor, to an application of the one or more applications executing on the computer system, access to a subset of the one or more operating parameter values;

after the granting of access to the subset of operating parameter values, receiving, by the optimization function, a request to adjust at least one operating parameter value of the subset of operating parameter values, wherein the request to adjust the at least one operating parameter value in the WOR is sent from the application to the optimization function, wherein the request to adjust the at least one operating parameter value comprises a function call that includes a specification of the at least one operating parameter value and a target performance range;

determining, by the optimization function, an adjusted value for the at least one subset of operating parameter during execution of the application, wherein the determined adjusted value meets the target performance range;

setting, by the optimization function, the at least one operating parameter value to the corresponding adjusted value in the WOR of the processor; and after setting the at least one operating parameter value to the adjusted value, continuing execution of the application according to the WOR by the processor;

wherein the granting of access to the subset of operating parameter values includes:

(a) receiving, by the hypervisor, a request for access to the WOR, wherein the request to access the WOR is sent from the application to the hypervisor before the application issues the request to the optimization function to adjust the at least one operating parameter value stored in the WOR;

(b) setting, by the hypervisor, an index variable N to a value of zero;

(c) determining, by the hypervisor, whether adjustment of the operating parameter value at index N of the one or more operating parameters values stored in the WOR by the application will interfere with other applications of the one or more applications that are executing on the computer system;

(d) if it is determined that the adjustment of the operating parameter value at index N of the one or more operating parameter values stored in the WOR by the application will interfere with an other applications of the one or more applications executing in the processor, then setting an element at index N in an array to be equal to zero to indicate a determination of interference, wherein the array has a length equal to the number of operating parameters values in the WOR;

(e) if it is determined that the adjustment of the operating parameter value at index N of the one or more operating parameter values stored in the WOR by the application will not interfere with any other applications of the one or more applications executing in the processor, then setting the element at index N in the array to be equal to one to indicate a determination of no interference;

(f) determining whether index variable N is equal to the number of operating parameter values stored in the WOR;

(g) if it is determined that index variable N is not equal to the number of operating parameter values, then incrementing index variable N by one, and repeating steps (c)-(g); and (h) if it is determined that index variable N is equal to the number of operating parameter values stored in the WOR, then determining the subset of the operating parameter values to be those operating parameter values that correspond to a value of one in the array, and granting, by the hypervisor, the application access to the subset of operating parameter values.

2. The method of claim 1, wherein the request that is sent from the application to the optimization function includes an index that corresponds to the application, and further comprising:
determining whether the index corresponding to the application is listed in an index table, wherein the index table includes a plurality of indexes that are each associated with a respective operating parameter value;
based on determining that the index is listed in the index table, setting the at least one operating parameter value of the WOR equal to the operating parameter value that is associated with the index in the index table; and
based on determining that the index is not listed in the index table, performing the determination of the adjusted value during execution of the application and writing the index and the determined adjusted value into the index table.

3. The method of claim 1, wherein the one or more operating parameter values comprises a branch history algorithm, a branch history depth, a cache data prefetch depth, whether to enable store-hit-load prevention, whether to route all fixed-point operations to a fixed point unit (FXU), whether to route all loads to a load unit, an instruction prefetch depth, and a store gather window size.

4. The method of claim 1, wherein determining an adjusted value for the at least one operating parameter value during execution of the application comprises:
iterating through all possible values of the at least one operating parameter value, the possible values being values of the at least one operating parameter value that are supported by the processor;
measuring performance of the processor for each of the possible values by a performance monitoring unit; and
determining a value of the at least operating parameter value that gives a highest performance of the processor.

5. The method of claim 1, wherein determining an adjusted value for the at least one operating parameter value during execution of the application comprises:
determining whether a current performance of the processor falls within the target performance range; and
based on the current performance of the processor not falling within the target performance range, adjusting the at least one operating parameter value such that the processor performance falls within the target performance range.

6. A computer program product for implementing for application-level processor parameter management in a computer system comprising a hypervisor, a processor, one or more applications executing in the computer system, a workload optimization register (WOR) that stores one or more operating parameter values of the processor, and an optimization function that executes on the computer system that is separate from the hypervisor, the computer program product comprising:
a computer readable storage medium having program instructions embodied therewith, the program instructions readable by a processing circuit to cause the processing circuit to perform a method comprising:
granting, by the hypervisor, to an application of the one or more applications executing on the computer system, access to a subset of the one or more operating parameter values;
after the granting of access to the subset of operating parameter values, receiving, by the optimization function, a request to adjust at least one operating parameter value of the subset of operating parameter values, wherein the request to adjust the at least one operating parameter value in the WOR is sent from the application to the optimization function, wherein the request to adjust the at least one operating parameter value comprises a function call that includes a specification of the at least one operating parameter value and a target performance range;
determining, by the optimization function, an adjusted value for the at least one subset of operating parameter during execution of the application, wherein the determined adjusted value meets the target performance range;
setting, by the optimization function, the at least one operating parameter value to the corresponding adjusted value in the WOR of the processor; and
after setting the at least one operating parameter value to the adjusted value, continuing execution of the application according to the WOR by the processor;
wherein the granting of access to the subset of operating parameter values includes:
(a) receiving, by the hypervisor, a request for access to the WOR, wherein the request to access the WOR is sent from the application to the hypervisor before the application issues the request to the optimization function to adjust the at least one operating parameter value stored in the WOR;
(b) setting, by the hypervisor, an index variable N to a value of zero;
(c) determining, by the hypervisor, whether adjustment of the operating parameter value at index N of the one or more operating parameters values stored in the WOR by the application will interfere with other applications of the one or more applications that are executing on the computer system;

(d) if it is determined that the adjustment of the operating parameter value at index N of the one or more operating parameter values stored in the WOR by the application will interfere with another applications of the one or more applications executing in the processor, then setting an element at index N in an array to be equal to zero to indicate a determination of interference, wherein the array has a length equal to the number of operating parameters values in the WOR;

(e) if it is determined that the adjustment of the operating parameter value at index N of the one or more operating parameter values stored in the WOR by the application will not interfere with any other applications of the one or more applications executing in the processor, then setting the element at index N in the array to be equal to one to indicate a determination of no interference;

(f) determining whether index variable N is equal to the number of operating parameter values stored in the WOR;

(g) if it is determined that index variable N is not equal to the number of operating parameter values, then incrementing index variable N by one, and repeating steps (c)-(g); and (h) if it is determined that index variable N is equal to the number of operating parameter values stored in the WOR, then determining the subset of the operating parameter values to be those operating parameter values that correspond to a value of one in the array, and granting, by the hypervisor, the application access to the subset of operating parameter values.

7. The computer program product of claim 6, wherein the request that is sent from the application to the optimization function includes an index that corresponds to the application, and the method performed by the processing circuit further comprising:
determining whether the index corresponding to the application is listed in an index table, wherein the index table includes a plurality of indexes that are each associated with a respective operating parameter value;
based on determining that the index is listed in the index table, setting the at least one operating parameter value of the WOR equal to the operating parameter value that is associated with the index in the index table; and
based on determining that the index is not listed in the index table, performing the determination of the adjusted value during execution of the application and writing the index and the determined adjusted value into the index table.

8. The computer program product of claim 6, wherein the one or more operating parameter values comprises a branch history algorithm, a branch history depth, a cache data prefetch depth, whether to enable store-hit-load prevention, whether to route all fixed-point operations to a fixed point unit (FXU), whether to route all loads to a load unit, an instruction prefetch depth, and a store gather window size.

9. The computer program product of claim 6, wherein determining an adjusted value for the at least one operating parameter value during execution of the application comprises:
iterating through all possible values of the at least one operating parameter value, the possible values being values of the at least one operating parameter value that are supported by the processor;
measuring performance of the processor for each of the possible values by a performance monitoring unit; and
determining a value of the at least one operating parameter value that gives a highest performance of the processor.

10. The computer program product of claim 6, wherein determining an adjusted value for the at least one operating parameter value during execution of the application comprises:
determining whether a current performance of the processor falls within the target performance range; and
based on the current performance of the processor not falling within the target performance range, adjusting the at least one operating parameter value such that the processor performance falls within the target performance range.

11. A computer system for application-level processor parameter management, the system comprising:
a hypervisor;
one or more applications executing in the computer system;
a workload optimization register (WOR) that stores one or more operating parameter values of a processor;
an optimization function that executes on the computer system that is separate from the hypervisor;
a memory; and
the processor, communicatively coupled to said memory, the computer system configured to perform a method comprising:
granting, by the hypervisor, to an application of the one or more applications executing on the computer system, access to a subset of the one or more operating parameter values;
after the granting of access to the subset of operating parameter values, receiving, by the optimization function, a request to adjust at least one operating parameter value of the subset of operating parameter values, wherein the request to adjust the at least one operating parameter value in the WOR is sent from the application to the optimization function, wherein the request to adjust the at least one operating parameter value comprises a function call that includes a specification of the at least one operating parameter value and a target performance range;
determining, by the optimization function, an adjusted value for the at least one subset of operating parameter during execution of the application, wherein the determined adjusted value meets the target performance range;
setting, by the optimization function, the at least one operating parameter value to the corresponding adjusted value in the WOR of the processor; and
after setting the at least one operating parameter value to the adjusted value, continuing execution of the application according to the WOR by the processor;
wherein the granting of access to the subset of operating parameter values includes:
(a) receiving, by the hypervisor, a request for access to the WOR, wherein the request to access the WOR is sent from the application to the hypervisor before the application issues the request to the optimization function to adjust the at least one operating parameter value stored in the WOR;
(b) setting, by the hypervisor, an index variable N to a value of zero;
(c) determining, by the hypervisor, whether adjustment of the operating parameter value at index N of the one or more operating parameters values stored in the WOR by the application will interfere with other applications of the one or more applications that are executing on the computer system;

(d) if it is determined that the adjustment of the operating parameter value at index N of the one or more operating parameter values stored in the WOR by the application will interfere with any other applications of the one or more applications executing in the processor, then setting an element at index N in an array to be equal to zero to indicate a determination of interference, wherein the array has a length equal to the number of operating parameters values in the WOR;

(e) if it is determined that the adjustment of the operating parameter value at index N of the one or more operating parameter values stored in the WOR by the application will not interfere with any other applications of the one or more applications executing in the processor, then setting the element at index N in the array to be equal to one to indicate a determination of no interference;

(f) determining whether index variable N is equal to the number of operating parameter values stored in the WOR;

(g) if it is determined that index variable N is not equal to the number of operating parameter values, then incrementing index variable N by one, and repeating steps (c)-(g); and (h) if it is determined that index variable N is equal to the number of operating parameter values stored in the WOR, then determining the subset of the operating parameter values to be those parameter values that correspond to a value of one in the array, and granting, by the hypervisor, the application access to the subset of operating parameter values.

12. The system of claim 11, wherein the request that is sent from the application to the optimization function includes an index that corresponds to the application, and the method performed by the system further comprising:

determining whether the index corresponding to the application is listed in an index table, wherein the index table includes a plurality of indexes that are each associated with a respective operating parameter value;

based on determining that the index is listed in the index table, setting the at least one operating parameter value of the WOR equal to the operating parameter value that is associated with the index in the index table; and based on determining that the index is not listed in the index table, performing the determination of the adjusted value during execution of the application and writing the index and the determined adjusted value into the index table.

13. The system of claim 11, wherein the one or more operating parameter values comprises a branch history algorithm, a branch history depth, a cache data prefetch depth, whether to enable store-hit-load prevention, whether to route all fixed-point operations to a fixed point unit (FXU), whether to route all loads to a load unit, an instruction prefetch depth, and a store gather window size.

14. The system of claim 11, wherein determining an adjusted value for the at least one operating parameter value during execution of the application comprises:

iterating through all possible values of the at least one operating parameter value, the possible values being values of the at least one operating parameter value that are supported by the processor, measuring performance of the processor for each of the possible values by a performance monitoring unit; and determining a value of the at least one operating parameter value that gives a highest performance of the processor.

* * * * *